Jan. 5, 1965 P. R. GLEY 3,163,949

DIGITAL ILLUMINATED DISPLAY DEVICE

Filed Nov. 30, 1962 3 Sheets-Sheet 1

INVENTOR.
Paul R. Gley
BY W. Lee Helms
Attorney

Jan. 5, 1965

P. R. GLEY 3,163,949

DIGITAL ILLUMINATED DISPLAY DEVICE

Filed Nov. 30, 1962

INVENTOR.
Paul R. Gley
BY H. Lee Helms
attorney

Jan. 5, 1965  P. R. GLEY  3,163,949
DIGITAL ILLUMINATED DISPLAY DEVICE
Filed Nov. 30, 1962  3 Sheets-Sheet 3

United States Patent Office 3,163,949
Patented Jan. 5, 1965

3,163,949
DIGITAL ILLUMINATED DISPLAY DEVICE
Paul R. Gley, Hillsdale, N.J., assignor to Dependable Printed Circuit Corp., Wayne, N.J., a corporation of New Jersey
Filed Nov. 30, 1962, Ser. No. 241,258
3 Claims. (Cl. 40—130)

This invention relates to an electrically illuminated digital display device adapted to display, upon the application of suitable certain closing contact members, the complete alphabet, numerals in relatively large extent, and other symbols. The device may be used in multiple, for example side by side, for display of correlated material such as words and sentences, and for the rapid change in the words and/or digits by variations in the applied circuit closing contact members.

The increasing trend throughout the electronics industry toward in-line display, has been stimulated by the necessity for greater readout accuracy, and by the confusion and difficulty of reading analog and non-in-line displays. Evidence in this change is shown by the number of in-line devices that are presently available today. However, the current devices leave much to be desired, such as readability as a function of viewing distance, readability as a function of viewing angle, and objection because of complicated apparatus.

In digital display devices, with regards to size and readability, the distance and space available must be considered. The readout used must have characters easily read at the desired distance and angle. At the same time, the overall dimensions of the readout, except in outdoor and shop window use, should be small in order to conserve space and weight.

One of the important objects of my invention is to provide for the herebefore described features, such as compactness in overall size, light weight, inexpensive for manufacture, and providing excellent viewing readability.

The most important object of my invention is to provide a readout device that can display the complete alphabet from A to Z plus all the numbers from 0 to 19 plus a (100) and other mathematical and special symbols and code indicia, with employment of a very small number of illuminating units, such as electric bulbs and their equivalent.

Another important object of my invention is the ability of my readout device to display the characters in one or more colors as desired or required. As stated, several of my devices may be joined for in-line group reading.

The invention will be described with reference to the accompanying drawings, in which.

Figure 1:
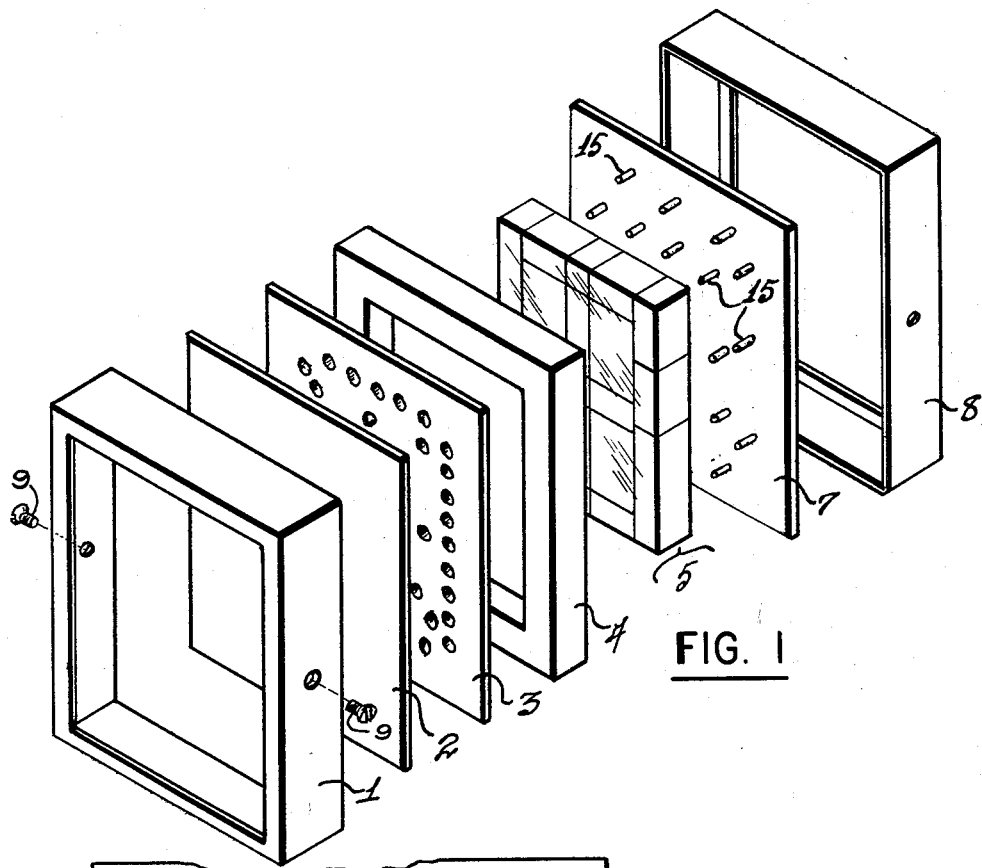
FIG. 1 is a schematic view, in perspective, showing the units of the device separated and in their order.

FIG. 1 illustrates one embodiment of the invention, with the elements separated. At 1 I have shown a frame to receive at its front area a transparent plate 2, rearwardly of which will be positioned a master pattern screen 3, which will be positioned forwardly of a sub-frame 4 for a lamp cell block 5. It is preferred that this block consist of a plurality of separate block units of plastics, Lucite being a suitable material, and each block will have its sides and its top and bottom rendered opaque. A simple method will be to spray the side, top and bottom faces with a suitable opaque lacquer or the like.

Figure 3:
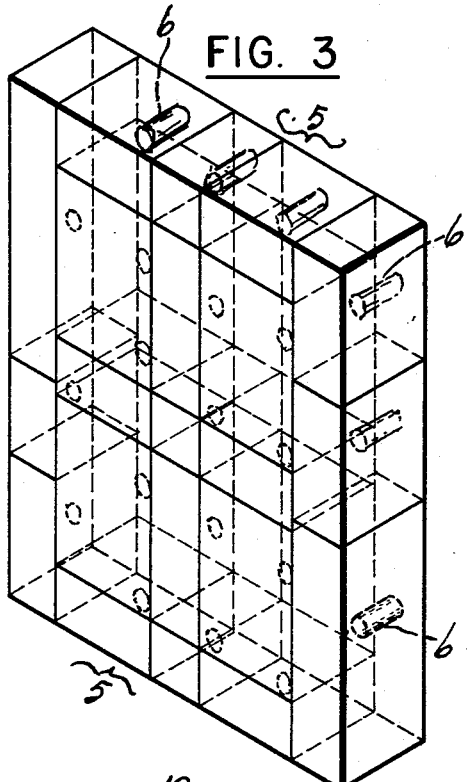
FIG. 3 is an isometric view, partly in dotted line, showing the lamp cell block which coacts with the master pattern screen.

As shown in FIG. 3, primarily at the top and right-hand margin, each block unit will be formed with a lamp-receiving aperture, indicated in the figure at 6, to receive an appropriate lamp carried by the lamp holding plate 7. A rear frame 8 will enclose members 4, 5, 7 and 8, and will have a sufficient margin to embrace the frame 1, the two frames being held together in any suitable manner, as for example by the screws 9. It will be understood that in the somewhat schematic view of FIG. 3, the block unit cells for the lamps 15 are indicated by circular dotted lines showing the front end of the appropriate aperture, except that certain top and right-hand and side blocks of FIG. 3 indicate the apertures in full depth.

The lamp holding plate 7 may be made of plastic. It holds lamps 15, one for each block unit, and it will be seen that the blocks vary in size.

In the present embodiment, the rear of the lamp holding plate carries a printed positive circuit lead and branch leads, indicated at 11, and receiving current from contact member 12. Along the printed circuit leads are disposed rows of negative contacts 14 which in practice will be projections, for receiving ground contact devices for selectively closing the circuit between appropriate lamps carried by plate 7.

Figure 4:
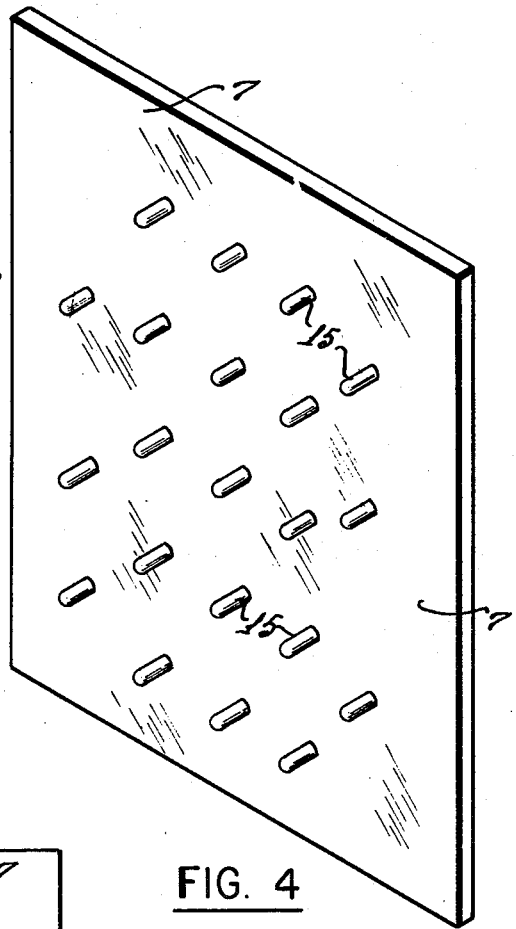
FIG. 4 is an isometric view of the lamp holding plate, with lamps carried thereby.
Figure 5:
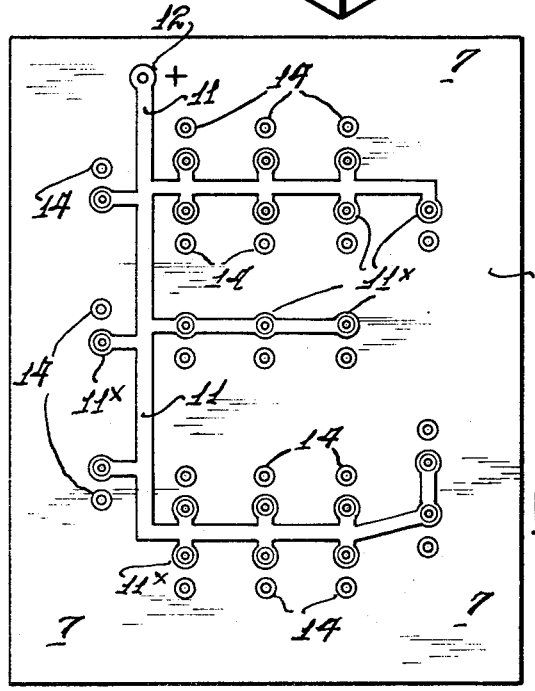
FIG. 5 is a plan view showing the contact assembly for the lamps.
Figure 6:
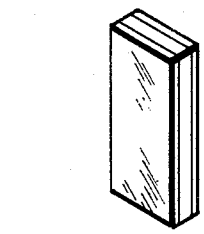
FIG. 6 is an isometric view of the lamp cell block with its rear lamp holder and contact assembly plate, and its front cover which may be transparent.

FIGS. 4 and 5 are largely schematic as to the holding of the lamps on plate 7. Thus, as to each lamp, it may be sunk into the lamp holding plate 7 or positioned entirely in front of the same, with holding wires running from its negative and positive contact points to the projected negative contacts 14 in one case, and to the positive contacts 11x in the other case, the essential only being that there is projected outwardly of plate 7 contact posts, either positive or negative, which may receive or ground current to selected lamps of the group.

In the present embodiment, there are 21 block units within lamp cell block 5, and also there are 21 lamps, one for each block. However, the master pattern screen is provided with 52 light emitting openings, and each lamp cell block unit has a plurality of apertures in register with the cell block, except for the block unit at the center and its top in line and bottom in line cell blocks. Therefore, each lamp, with the exception of the stated three, will illuminate a plurality of light emitting openings in the master pattern screen.

Figure 2:
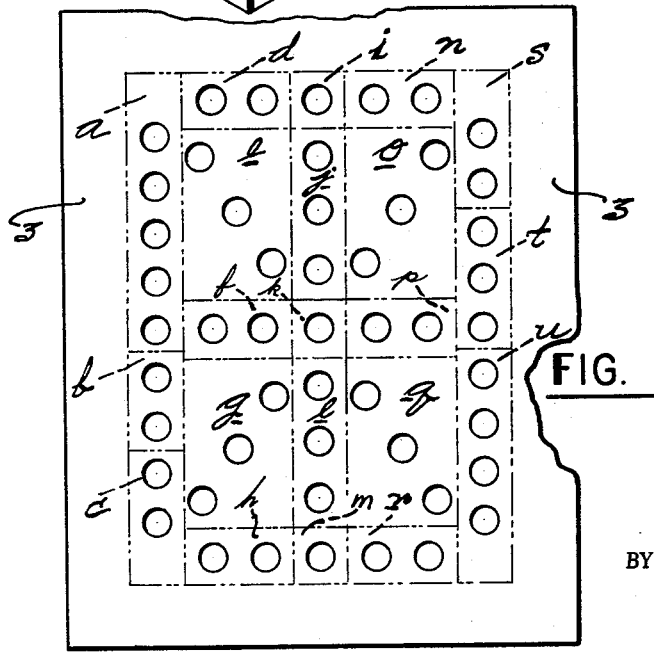
FIG. 2 is a plan view of the master pattern screen.
Figure 7:
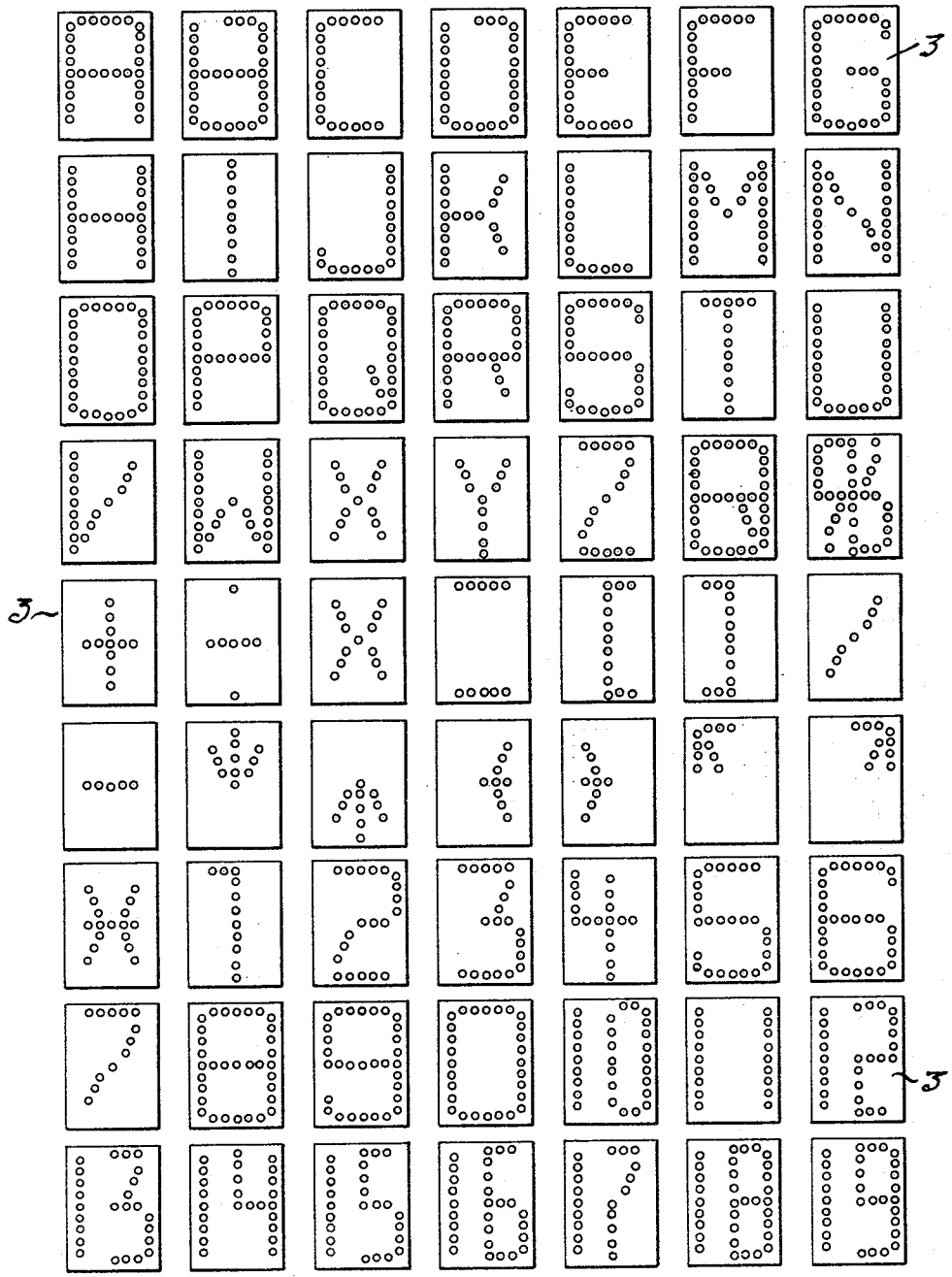
FIG. 7 is a schematic view showing the illuminated master pattern screen in illumination of letters, numerals, and other symbols produced by closing the circuit through selected lamps, in each case.

Reference to FIG. 7 will illustrate how negative contact with selected projecting contact posts 14 at the rear of the lamp holding plate will effect light emission through the master pattern screen of all the letters of the alphabet, various numerals, and various symbols. In FIGURE 2, the cell block units are designated by the letters $a$, $b$, $c$, $d$, $e$, $f$, $g$, $h$, $i$, $j$, $k$, $l$, $m$, $n$, $o$, $p$, $q$, $r$, $s$, $t$ and $u$. Referring to FIG. 7, it will be seen that for illumination of the letter A, by means of the master pattern screen, the individual lamp for each of the cell block units, $a$, $b$, $c$, $d$, $i$, $n$, $s$, $t$, $u$, together with the lamps for cell blocks $f$, $k$ and $p$, will be illuminated. For the letter M, the cell block units $a$, $b$, $c$, $k$, $e$, $o$, $s$, $t$ and $u$, will be illuminated, although 25 light emitting openings in the screen will have illumination, the number of lamps employed are only nine in number.

For the letter X, the cell blocks $e$, $g$, $k$, $o$ and $q$ are illuminated, five blocks in all, whereas the light emitting openings of the master pattern screen are 13 in number.

In the illumination of the numeral 10, blocks *a, b, c, j, k, l, n, r, s, t* and *u* are employed, the blocks being eleven in all, whereas 29 light emitting openings will be illuminated in the master pattern screen.

By comparing FIGURE 2 with each one of the pattern screen illuminations shown in FIG. 7, it will appear which one of the blocks are illuminated for any given letter, numeral or symbol.

It will be understood that various modifications may be made in the elements comprising the embodiment illustrated, without departing from the spirit of the invention.

It has been stated above that Lucite is a suitable plastic material for the cells of the cell block. However, a preferred material is Plexiglas. One of the featured attractions of Plexiglas is found in edge-lighting. Because of the almost perfect transparency of Plexiglas, light rebounds from its polished surfaces and remains in the Plexiglas, even following it around the bends, leaving only at the opposite end or at sanded or machined spots along the way. This "light piping" characteristic is, of course, present in a degree in any transparent material with polished surface; it is particularly spectacular in Plexiglas because Plexiglas is so very clean and can be so perfectly polished.

When two glass fibers come within about half a wavelength of each other, some light leaks from one to the other. If the fibers are closely packed, they touch over an appreciable area, and leakage, or "crosstalk" becomes a serious problem. Such a bundle would degrade the transmitted image by loss of contrast. For this reason the fiber or plastic blocks are usually insulated from each other by a thin jacket or coat of opaque material. This cladding, usually a phenolic material or painted coating, reduces crosstalk and protects the smooth reflecting walls. The surfaces which are not used to make a light pattern are coated with a reflecting material—such as silver plating or an intense white. This coating must be applied before the other cladding is applied. The reflecting material used will increase the light output.

A modification which is so easily understood as not to require illustration is the provision in each cell of a plurality of lamps of different colors, thus a white lamp, a green lamp, and a red lamp, each connected to one pole of a circuit, and each having a contact projection as in the case of the single lamp arrangement hereinbefore described. Therefore selected contact members may illuminate one of the cell plurality of lamps, or two of them to provide a given color shade, or all of them to still vary the shade. A variation would be provide a transparent multi-colored mask for each cell.

Having described my invention, what I claim and desire to secure by Letters Patent is as follows:

1. A digital illuminated display device comprising an assembly of lamp cell blocks which are laterally light-shielded one from the other the blocks being immediately adjacent to each other and in rows, a lamp in each cell block, the lamps being adapted for electrical illumination, and the blocks mutually varying in area, electrical circuit means rearwardly of the cell block assembly and connected to one pole of each of said lamps, a projecting contact member connected to the second pole of each of said lamps, whereby selected lamps may be illuminated by circuit closing members applied to the appropriate selected number of said projecting contact members, and a master pattern screen at the outer face of said cell block assembly, the screen being provided with a substantially greater number of light emitting openings for each of a majority of lamps of the cell block appropriate thereto, and providing for a plurality of discreet light emissions from each of the majority of the lamps in said cell block assembly.

2. A digital illuminated display device constructed in accordance with claim 1, in which the blocks of the assembled cell blocks are composed of a solid light-diffusing material, characterized by plastic, each of said blocks being formed with an opening, surrounded by the solid material of the block, said opening receiving one of said lamps.

3. A digital illuminated display device comprising an assembly of lamp cell blocks of plastic characterized by Lucite and Plexiglas, the cell blocks being adjacent each other and in rows, and the blocks being laterally light-shielded one from the other, each cell block being apertured centrally thereof, a lamp in each cell block and adapted for electrical illumination, electrical circuit means rearwardly of the cell block assembly and connected to one pole of each said lamp, a projecting contact member connected to the second pole of each of said lamps, whereby selected lamps may be illuminated by circuit closing members applied to the appropriate projecting contact members, a master pattern screen at the outer face of said cell block asesmbly, the screen being provided with a substantially greater number of light-emitting openings for each of the majority of lamps of the cell block appropriate thereto and providing for a plurality of discrete light emissions from each of the majority of the lamps in said cell block assembly.

References Cited by the Examiner

UNITED STATES PATENTS

| | | |
|---|---|---|
| 512,395 | 1/94 | Rogers. |
| 683,133 | 9/01 | Mason. |
| 1,157,856 | 10/15 | Eubank. |
| 2,740,957 | 4/56 | Davies. |
| 2,945,313 | 7/60 | Hardesty. |
| 2,998,597 | 8/61 | Edwards. |

JEROME SCHNALL, *Primary Examiner.*

LAWRENCE CHARLES, *Examiner.*